(12) United States Patent
Traore et al.

(10) Patent No.: US 11,936,795 B2
(45) Date of Patent: Mar. 19, 2024

(54) METHOD AND SYSTEM FOR GENERATING KEYS FOR AN ANONYMOUS SIGNATURE SCHEME

(71) Applicant: ORANGE, Issy-les-Moulineaux (FR)

(72) Inventors: Jacques Traore, Chatillon (FR); Nicolas Desmoulins, Chatillon (FR); Guillaume Odriosolo, Chatillon (FR); Adam Ouorou, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 260 days.

(21) Appl. No.: 17/418,033

(22) PCT Filed: Dec. 17, 2019

(86) PCT No.: PCT/FR2019/053114
§ 371 (c)(1),
(2) Date: Jun. 24, 2021

(87) PCT Pub. No.: WO2020/136320
PCT Pub. Date: Jul. 2, 2020

(65) Prior Publication Data
US 2022/0103377 A1    Mar. 31, 2022

(30) Foreign Application Priority Data
Dec. 24, 2018    (FR) ...................... 1874108

(51) Int. Cl.
*H04L 9/32*    (2006.01)
*H04L 9/08*    (2006.01)

(52) U.S. Cl.
CPC .......... *H04L 9/3255* (2013.01); *H04L 9/0861* (2013.01); *H04L 2209/42* (2013.01); *H04L 2209/463* (2013.01)

(58) Field of Classification Search
CPC . H04L 9/3255; H04L 9/0861; H04L 2209/42; H04L 2209/463
See application file for complete search history.

(56) References Cited

U.S. PATENT DOCUMENTS

| | | | |
|---|---|---|---|
| 6,446,052 B1 * | 9/2002 | Juels ...................... | G06Q 20/10 705/69 |
| 7,234,059 B1 * | 6/2007 | Beaver .................. | H04L 9/0833 713/180 |

(Continued)

FOREIGN PATENT DOCUMENTS

FR    2940726 A1    7/2010

OTHER PUBLICATIONS

International Search Report dated Feb. 20, 2020 for corresponding International Application No. PCT/FR2019/053114, Dec. 17, 2019.

(Continued)

*Primary Examiner* — David Garcia Cervetti
(74) *Attorney, Agent, or Firm* — David D. Brush; Westman, Champlin & Koehler, P.A.

(57) ABSTRACT

A method for anonymous signature of a message executed by a member entity of a group. The method includes: registering the member entity with an administration entity of the group; generating by the member entity a trace from a trace generator calculated by at least one revocation entity and included in a public key of the group, the trace being invariant relative to the anonymous signatures generated by the member entity in accordance an anonymous signature scheme; blindly obtaining by the member entity a private group key; and generating at least one signature according to the anonymous signature scheme by using the private key, the signature comprising the trace.

7 Claims, 8 Drawing Sheets

(56) References Cited

U.S. PATENT DOCUMENTS

| | | | | |
|---|---|---|---|---|
| 8,225,098 | B2* | 7/2012 | Chen | H04L 9/3073 713/176 |
| 8,352,378 | B2* | 1/2013 | Al-Herz | H04L 9/006 705/26.42 |
| 8,499,149 | B2* | 7/2013 | Chen | H04L 9/3247 713/168 |
| 10,320,569 | B1* | 6/2019 | Wentz | H04L 9/3239 |
| 11,176,546 | B2* | 11/2021 | Ignatchenko | G06Q 20/351 |
| 2003/0081785 | A1* | 5/2003 | Boneh | H04L 9/0847 380/277 |
| 2004/0260926 | A1* | 12/2004 | Arditti Modiano | H04L 9/3255 713/170 |
| 2005/0097336 | A1* | 5/2005 | Canard | G06Q 20/40975 713/185 |
| 2005/0169461 | A1* | 8/2005 | Canard | H04L 9/3255 380/28 |
| 2005/0246533 | A1* | 11/2005 | Gentry | H04L 9/0836 713/170 |
| 2005/0268103 | A1* | 12/2005 | Camenisch | H04L 9/3234 713/176 |
| 2005/0278536 | A1* | 12/2005 | Canard | H04L 9/3257 713/180 |
| 2006/0015737 | A1* | 1/2006 | Canard | H04L 9/3255 713/177 |
| 2006/0155985 | A1* | 7/2006 | Canard | H04L 63/0823 713/156 |
| 2007/0255661 | A1* | 11/2007 | Yoshida | H04L 9/3218 705/74 |
| 2007/0256125 | A1* | 11/2007 | Chen | H04L 9/3234 726/18 |
| 2008/0046310 | A1* | 2/2008 | Canard | H04L 9/3255 713/180 |
| 2008/0091941 | A1* | 4/2008 | Yonezawa | H04L 9/3255 713/180 |
| 2008/0201262 | A1* | 8/2008 | Saito | G06Q 30/0601 705/50 |
| 2008/0244276 | A1* | 10/2008 | Prouff | H04L 9/3255 713/193 |
| 2008/0270786 | A1* | 10/2008 | Brickell | H04L 9/3255 713/180 |
| 2008/0270790 | A1* | 10/2008 | Brickell | G06F 21/57 713/176 |
| 2008/0307223 | A1* | 12/2008 | Brickell | H04L 9/3268 713/158 |
| 2009/0024852 | A1* | 1/2009 | Yonezawa | H04L 9/3255 713/180 |
| 2009/0046854 | A1* | 2/2009 | Di Crescenzo | H04L 9/002 380/44 |
| 2009/0129600 | A1* | 5/2009 | Brickell | H04L 9/3234 380/282 |
| 2009/0210705 | A1* | 8/2009 | Chen | H04L 9/0891 713/158 |
| 2010/0082973 | A1* | 4/2010 | Brickell | H04L 9/3255 713/180 |
| 2010/0169656 | A1* | 7/2010 | Yoshida | H04L 9/3255 713/180 |
| 2011/0060903 | A1* | 3/2011 | Yoshida | H04L 9/302 713/155 |
| 2011/0179269 | A1* | 7/2011 | Furukawa | H04L 9/3255 713/156 |
| 2012/0017083 | A1* | 1/2012 | Canard | H04L 9/0891 713/158 |
| 2012/0060028 | A1* | 3/2012 | Furukawa | H04L 9/3218 713/156 |
| 2012/0072732 | A1* | 3/2012 | Canard | H04L 9/3247 713/176 |
| 2012/0284518 | A1* | 11/2012 | Walker | H04L 9/3268 713/171 |
| 2013/0311770 | A1* | 11/2013 | Reffe | G05B 19/418 713/155 |
| 2015/0067340 | A1* | 3/2015 | Joye | H04L 9/0869 713/175 |
| 2016/0013946 | A1* | 1/2016 | Patey | H04L 9/3218 713/180 |
| 2018/0309574 | A1* | 10/2018 | Lyubashevsky | H04L 9/3093 |
| 2019/0052470 | A1* | 2/2019 | Park | H04L 9/3255 |
| 2020/0126075 | A1* | 4/2020 | Fisch | G06F 21/6245 |
| 2020/0349616 | A1* | 11/2020 | El Kaafarani | G06Q 30/0282 |

OTHER PUBLICATIONS

Written Opinion of the International Searching Authority dated Feb. 20, 2020 for corresponding International Application No. PCT/FR2019/053114, filed Dec. 17, 2019.

Desmoulins Nicolas et al. Direct Anonymous Attestations with Dependent Basename Opening, International Conference on Computer Analysis of Images and Patterns. CAIP 2017: Computer Analysis of Images and Patterns; [Lecture Notes in Computer Science; Lect. Notes Computer], Springer, Berlin, Heidelberg. pp. 206-221, Oct. 22, 2014 (Oct. 22, 2014), XP047302160.

English translation of the Written Opinion of the International Searching Authority dated Mar. 2, 2020 for corresponding International Application No. PCT/FR2019/053114, filed Dec. 17, 2019.

Boneh, D. et al., "Short Group Signatures" Crypto 2004, pp. 41-55.

Brickell, E. et al., "A New Direct Anonymous Attestation Scheme from Bilinear Maps" Trust 2008, pp. 166-178.

\* cited by examiner

METHOD AND SYSTEM FOR GENERATING KEYS FOR AN ANONYMOUS SIGNATURE SCHEME

CROSS-REFERENCE TO RELATED APPLICATIONS

The present application is a Section 371 National Stage Application of International Application No. PCT/FR2019/053114, filed on Dec. 17, 2019 and published as WO 2020/136320 A1 on Jul. 2, 2020, not in English, the contents of which are hereby incorporated by reference in their entireties.

DESCRIPTION OF THE RELATED ART

The invention applies to the context of cryptography and more precisely that of group signature.

It is recalled that a group signature scheme lets a user prove that he belongs to a group (for example bidders, subscribers to a service, etc.) without revealing his exact identity. Group signatures have the particular feature of being anonymous, as it is not possible to identify the signatory. Group signatures are called non-traceable since it cannot be determined whether two signatures have been sent by the same person or by two separate people.

The validity of a group signature can be verified by anybody because of a public key characterising the group called "public group key". To be a part of the group a member must register in advance with an administration entity of the group. During this registration phase, the future member blindly obtains a private group key which lets him sign messages in the name of the group. Only a trusted revocation authority, or revocation entity, has the power to revoke the anonymity of a group signature because of a private key called "trapdoor" which only it has. In practice, this trapdoor can in fact be shared among several revocation authorities; they need to cooperate to lift the anonymity of a signature. The group member is therefore protected against abusive lifting of anonymity.

The concept of group signature is described for example in the article by Dan Boneh, Xavier Boyen and Hovav Shacham: "Short Group Signatures. CRYPTO 2004: 41-55".

For some applications needing to preserve the anonymity of users, such as electronic voting or petition, it is preferable to implement a variant of group signatures, called direct anonymous attestation (DAA, Direct Anonymous Attestation). The concept of DAA is described for example in the article by Ernie Brickell, Liqun Chen, and Jiangtao Li: "A New Direct Anonymous Attestation Scheme from Bilinear Maps. TRUST 2008: 166-178".

Even though they are anonymous, direct anonymous attestations DAA, with the exception of group signatures, are traceable: it is therefore possible to determine whether two signatures DAA have been sent by the same person or by two separate people. In the context of electronic voting or petition, this traceability would ensure that a voter has voted once only or the electronic petition has properly been signed by different petitioners.

Unfortunately there is no known solution for lifting the anonymity of a signature DAA and therefore identifying a signatory. This raises problems for some applications, such as electronic voting, especially in countries where a voting list for identifying the voters who have voted must be accessible to all voters.

The invention proposes a solution for electronic signature which does not have the disadvantages of the solutions mentioned hereinabove.

SUMMARY OF THE INVENTION

Therefore, and according to a first aspect, the aim of the invention is a method for anonymous signature of a message, this method being executed by a member entity of a group and comprising:
  a step for registration of this member with an administration entity of the group;
  a step for generating a trace from a trace generator calculated by at least one revocation entity and included in a public key of the group, this trace being invariant relative to the anonymous signatures generated by this member entity in accordance with the scheme;
  a step for blindly obtaining a private group key;
  a step for generating at least one signature according to an anonymous signature scheme by using the private group key, the signature comprising the trace.

Correlatively, the aim of the invention is an anonymous signature device of a message executed by a member entity of a group and comprising:
  a registration module of this member entity with an administration entity of the group;
  a module for generating a trace from a trace generator calculated by at least one revocation entity and included in a public key of the group, this trace being invariant relative to the anonymous signatures generated by this member entity in accordance with the scheme;
  a module for blindly obtaining a private group key;
  a module for generating at least one signature by using this private group key, this signature comprising the trace.

The invention proposes a cryptographic method of anonymous signatures in which the group signatures are traceable.

Advantageously, and contrary to direct anonymous attestations, the anonymity of an anonymous signature generated by the members of the group in accordance with the scheme can be lifted by the revocation entities.

This cryptographic method also proves more effective, in particular in terms of calculation time, than schemes of direct anonymous attestations DAA or group signatures of the prior art. The security of this anonymous signature scheme is also based on an assumption of security called "non-interactive" considered as more "standard" by the cryptographic community than an assumption of security called "interactive" (for example involving an oracle) on which the most effective direct anonymous attestations schemes of the prior art are based. This type of anonymous signature scheme accordingly offers better security.

According to a second aspect, the invention relates to a method for generating keys for an anonymous signature scheme, this method comprising:
  a calculation step by at least one revocation entity of a pair of revocation keys comprising a public key and a private key, said private key being usable by this revocation entity to revoke the anonymity of an anonymous signature complying with said scheme;
  a registration step by a group administration entity of at least one member entity with the group;
  a calculation step, from the public key of the pair of revocation keys, of a trace generator, said trace generator being intended to be used by each member entity registered in the group to generate a trace representative of this member entity and invariant relative to the anonymous signatures generated by this member entity in accordance with the scheme;

each member entity being configured to blindly obtain a private group key, this private key being used by this member entity to generate anonymous signatures complying with the scheme, these anonymous signatures comprising the trace. "Obtaining blindly" refers to the fact that the administration entity of the group does not know the private group key used by the member entity for signing its messages.

Correlatively, the invention relates to a system for generating keys for an anonymous signature scheme, this system comprising:

at least one revocation entity configured to calculate a pair of revocation keys comprising a public key and a private key, said private key being usable by the revocation entity to revoke the anonymity of an anonymous signature according to said scheme;

a group administration entity configured to register at least one member entity with said group;

the revocation entity being configured to calculate, from a public key of the pair of revocation keys, a trace generator, this trace generator being intended to be used by each member entity to generate a trace representative of this member entity, this trace being invariant relative to the anonymous signatures generated by this member entity in accordance with said scheme;

each member entity being configured to blindly obtain a private group key, this private key being used by the member entity to generate anonymous signatures complying with the scheme, these anonymous signatures comprising the trace.

In a particular embodiment, the proposed method for generating keys comprises:

a step for generating a pair of keys of the scheme for the administration entity of the group;

the public key of the pair of revocation keys being calculated from a public key of this pair of keys.

In a particular embodiment, the trace generator is renewed periodically.

In a particular embodiment, the trace generator is specific to a given service. The service corresponds to a specific ballot for example.

In fact, by way of these functionalities, the proposed method for generating keys can apply to electronic voting. In fact it offers a signature scheme which is:

anonymous which ensures secret voting;

traceable which ensures that a voter does not vote twice; and in which the anonymity of signatures is revocable, accordingly allowing revocation entities, in the event of recourse for example, to compile a voting list of the ballot.

In a particular embodiment, the different steps of the method for generating keys and the voting method according to the invention are determined by computer program instructions.

As a consequence, another aim of the invention is a computer program, on an information medium, this program comprising instructions adapted to execute at least one method such as mentioned hereinabove.

This program can utilise any programming language, and be in the form of source code, object code, or intermediate code between source code and object code, such as in partially compiled form, or in any other preferred form.

Another aim of the invention is an information medium readable by a computer, and comprising instructions of a computer program such as mentioned hereinabove.

The information medium can be any entity or device capable of storing the program. For example, the medium can comprise storage means such as a ROM, for example a CD ROM or a microelectronic circuit ROM, or even magnetic recording means, for example a hard drive.

On the other hand, the information medium can be a transmissible medium such as an electrical or optical signal which can be conveyed via an electrical or optical cable, by radio or by other means. The program according to the invention can be downloaded in particular over a network of Internet type.

Alternatively, the information medium can be an integrated circuit into which the program is incorporated, the circuit being adapted to execute or be used in execution of the method in question.

BRIEF DESCRIPTION OF THE DRAWINGS

Other characteristics and advantages of the present invention will emerge from the following description in reference to the appended drawings which illustrate an exemplary embodiment devoid of any limiting character, in which.

DETAILED DESCRIPTION OF EMBODIMENTS

Notations and Assumptions

Figure 1:
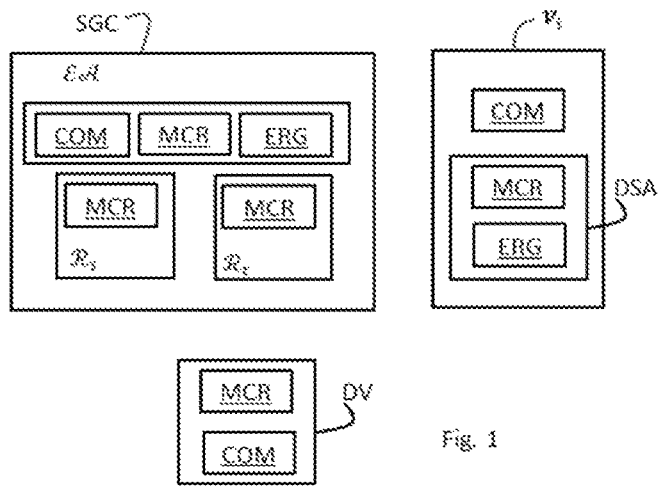
FIG. 1 illustrates a system for generating keys and an anonymous signature device according to an embodiment of the invention.

Throughout this document, the notation $PoK(\alpha_1, \alpha_2, \ldots, \alpha_n: \mathcal{R}(\alpha_1, \alpha_2, \ldots, \alpha_n))$ will be used to designate zero-knowledge proof of elements $\alpha_1, \alpha_2, \ldots, \alpha_n$ satisfying the relationship $\mathcal{R}$. So proof of knowledge of the two first factors of a public module RSA (from the name of the inventors, "Rivest-Shamir-Adleman") N would be noted as: $PoK(\alpha_1, \alpha_2: N=\alpha_1 \cdot \alpha_2 \wedge (\alpha_1 \neq 1) \wedge (\alpha_2 \neq 1))$.

In the following description,
p is a prime number;
the groups $G_1$, $G_2$ and $G_T$ are cyclic groups of order p;
g, h designate two generators, chosen randomly, of $G_1$;
$\tilde{h}$ is a generator, chosen randomly, of $G_2$;
e is a bilinear coupling of type 2 or 3, defined on the set $G_1 \times G_2$ to the set $G_T$.

It is recalled that a bilinear coupling, noted e, is an application defined on a set $G_1 \times G_2$ to a set $G_T$ where $G_1$, $G_2$ and $G_T$ designate cyclic groups of order p. This application e verifies the following properties:

Bilinearity: $\forall g_1 \in G_1$, $\forall g_2 \in G_2$ and $\forall (a, b) \in Z_p$, $e(g_1^a, g_2^b) = e(g_1, g_2)^{ab}$.

Non-degenerated: For $g_1 \neq 1_{G_1}$ and $g_2 \neq 1_{G_2}$, $e(g_1, g_2) \neq 1_{G_T}$, in which $1_{G_1}$ and $1_{G_2}$ designate respectively the neutral element of the groups $G_1$, $G_2$.

Calculable: $\forall g_1 \in G_1$, $\forall g_2 \in G_2$, there is an efficacious algorithm for calculating $e(g_1, g_2)$.

In practice, the groups $G_1$, $G_2$ and $G_T$ will be chosen such that there is no isomorphism calculable effectively between $G_1$ and $G_2$. Such couplings are known by the name of couplings of "Type 3" in the literature. In practice, and for a security level of 128 bits, the recommended sizes of the parameters of a coupling of "Type 3" are the following: 256 bits for the prime number p as well as for the elements of $G_1$, 512 for those of $G_2$ and 3072 for those of $G_T$.

The security of the scheme is based partly on the assumption that the problems below are difficult. In other terms, if an attacker is capable of jeopardising the security of the cryptographic scheme, then he is also capable of resolving these problems alleged to be "difficult".

Problem DDH

Let G be a cyclic group of first order p. Given a generator g∈G, any two elements $g^a$, $g^b \in G$ and a candidate $X \in G$, the Diffie-Hellman decisional problem (DDH) consists of determining whether $X = g^{ab}$ or not.

In the case of schemes based on bilinear couplings, there are difficult specific problems. For the couplings used in the invention, the inventors assume that the problem DDH is difficult in the groups $G_1$ and $G_2$. This hypothesis is known by the name of Diffie-Hellman external symmetrical hypothesis (SXDH).

For the method according to the invention, it can be demonstrated that if a third party (having no keys of revocation authorities) manages to identify the signatory of any anonymous signature then it is also capable of resolving the problem SXDH.

Problem q-MSDH

Let (p, $G_1$, $G_2$, $G_T$, e) be a bilinear environment of "Type 3" and g (respectively $\tilde{g}$) a generator of $G_1$ (respectively of $G_2$). Given $$\{(g^{x^i}, \tilde{g}^{x^i})\}_{i=0}^q$$

that $(g^a, \tilde{g}^a, \tilde{g}^{ax})$ where a and x are any two elements of $Z_p^*$, the problem q-MSDH consists of finding a quadruplet $$\left(\omega, P, h^{\frac{1}{x+\omega}}, h^{\frac{a}{P(x)}}\right)$$

where $h \in G_1^*$, P is a maximum-degree polynomial q and ω an element of $Z_p^*$, such that the polynomials P(X) and (X+ω) are the first.

It can be demonstrated that if a third party succeeds in "forging" signatures of the anonymous signature scheme according to the invention, then it is also capable of resolving the problem q-MSDH.

In the embodiment described here, at least in some of these aspects the invention implements:
one or more administration entities $\varepsilon\mathcal{A}$ of a group;
revocation authorities $\{\mathcal{R}_j\}_{j=1}^t$ with ($t \geq 1$);
member entities $V_i$ of the group. $\mathcal{G}$ designates the group of the n member entities.

FIG. 1 illustrates a system SGC for generating keys for an anonymous signature scheme $SigA_2$ and a member entity $V_i$ of a group $\mathcal{G}$ according to the invention. It also illustrates a verification device DV.

The member entity $V_i$ comprises a communications module COM and an anonymous signature device DSA according to the invention.

The system SGC for generating keys comprises an administration entity $\varepsilon\mathcal{A}$ of the group, and the revocation authorities $\{\mathcal{R}_j\}_{j=1}^t$ with ($t \geq 1$).

The administration entity $\varepsilon\mathcal{A}$ of the group comprises a communications module COM, a cryptographic module MCR and a registration module ERG configured to register at least one member entity $V_i$ in the group.

For this purpose, the device DSA of the member entity $V_i$ comprises a registration module ERG configured to register the member entity $V_i$ with the administration entity $\varepsilon\mathcal{A}$ of the group.

In the embodiment described here, each revocation entity $\mathcal{R}_j$ comprises a cryptographic module MCR configured to calculate a pair of revocation keys ($x_\mathcal{R}^j, P_j$), this pair comprising a public key $P_j$ and a private key $x_\mathcal{R}^j$ which can be used by the revocation entity to revoke the anonymity of an anonymous signature complying with said scheme $SigA_2$.

In the embodiment described here, the cryptographic module MCR of a revocation entity $\mathcal{R}_j$ is configured to calculate a trace generator $P_t = X_1^{\prod_{j=1}^t x_\mathcal{R}^j}$ from the private keys $x_\mathcal{R}^j$ of the pair of revocation keys, where $X_1$ designates a public parameter produced by the system for generating keys SGC.

In the embodiment described here, the device DSA of each member entity $V_i$ comprises a cryptographic module MCR configured to generate a trace $T_i = P_t^{s_i}$ representing the member entity $V_i$ by using this trace generator from the private key of the member entity $V_i$. This trace $T_i$ is invariant relative to the anonymous signatures $\sigma_i$ generated by the member entity in accordance with the scheme $SigA_2$.

In the embodiment described here, the cryptographic module MCR of each member entity $V_i$ is configured to blindly obtain a private group key $SK_G^i$.

In the embodiment described here, the cryptographic module MCR of each member entity $V_i$ is configured to generate signatures $\sigma_i$ of messages by using the private group key, these signatures comprising the trace $T_i$.

The verification device DV is configured to verify whether an anonymous signature $\sigma_i$ is compliant with the anonymous signature scheme $SigA_2$. It executes a verification algorithm which inputs a message msg, a signature $\sigma_i$ and the public key of the group $PK_G$. It determines whether the signature $\sigma_i$ is valid or not.

In the embodiment described here, the verification device DV comprises communication means COM and a cryptographic module MCR.

The communications module COM of the verification device DV is configured to obtain an anonymous signature $\sigma_i$ such that $\sigma_i=(w, w', c_1, T, P\Pi'_i)$.

The cryptographic module MCR of the verification device DV is configured to determine that the anonymous signature $\sigma_i$ of a message msg is valid if:

$w \neq 1_{G_1}$ $T \neq 1_{G_1}$;

$P\Pi'_i$ is valid; and $e(w, \tilde{X}_0) \cdot e(c_1, \tilde{X}_1) = e(w', \tilde{h})$.

In the embodiment described here, the cryptographic module MCR of a revocation entity $\mathcal{R}_j$ is configured to execute the method for lifting anonymity of a signature described later in reference to FIG. 5.

Figure 2:
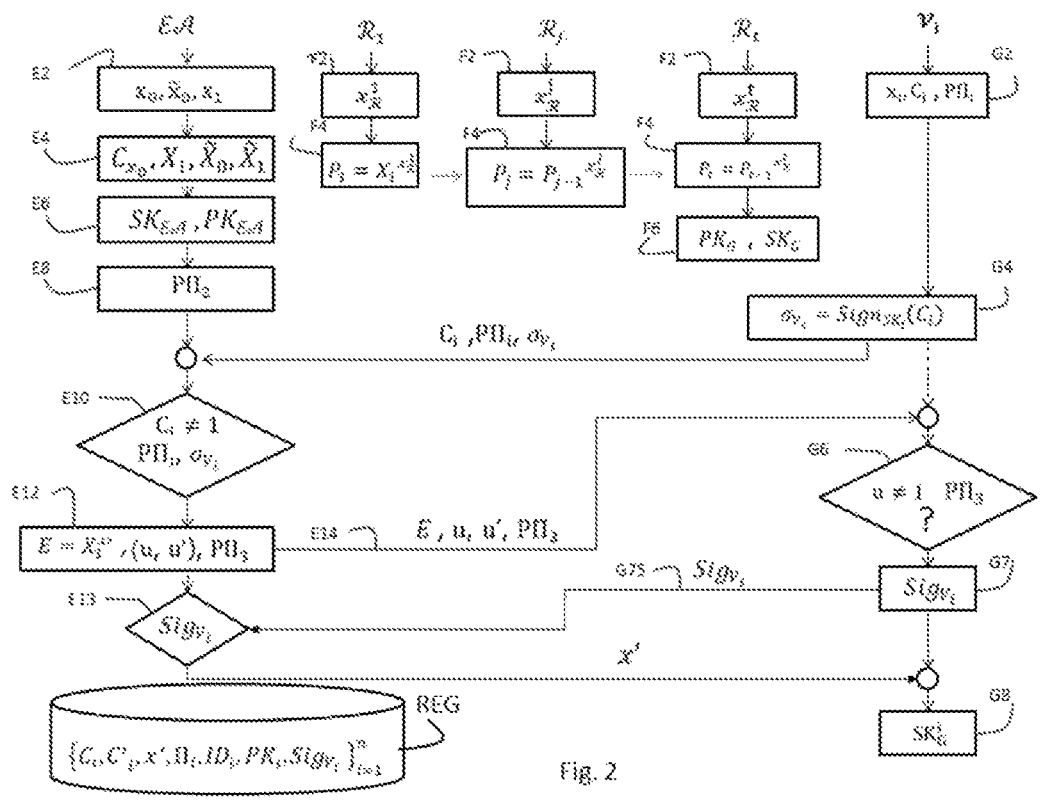
FIG. 2 illustrates the principal steps of a method for generating keys according to the invention in the form of a flowchart.

FIG. 2 illustrates the principal steps of a method for generating group keys according to the invention in the form of a flowchart.

During a step E2, the cryptographic module MCR of the administration entity $\varepsilon\mathcal{A}$ randomly draws three values, $x_0$, $\tilde{x}_0$, $x_1$ of $Z_p$.

During a step E4, the cryptographic module MCR of the administration entity $\varepsilon\mathcal{A}$ calculates $C_{x_0}=g^{x_0}h^{\tilde{x}_0}$, $X_1=h^{x_1}$, $\tilde{X}_0=\tilde{h}^{x_0}$, $\tilde{X}_1=\tilde{h}^{x_1}$.

During a step E6, the cryptographic module MCR of the administration entity $\varepsilon\mathcal{A}$ constitutes a pair of keys in which:
- the private key $SK_{\varepsilon\mathcal{A}}$ is constituted by the three values ($x_0$, $\tilde{x}_0$, $x_1$) which have been drawn randomly; and
- the public key $PK_{\varepsilon\mathcal{A}}$ is constituted by the elements calculated at step E4: $PK_\mathcal{A}=(C_{x_0}, X_1, \tilde{X}_0, \tilde{X}_1)$.

During a step E8, the cryptographic module MCR of the administration entity $\varepsilon\mathcal{A}$ generates a zero-knowledge proof $P\Pi_2$ to prove that it knows the private key associated with its public key. $P\Pi_2=PoK(\alpha_1, \alpha_2, \alpha_3: C_{x_0}=g^{\alpha_1}h^{\alpha_2} \wedge X_1=h^{\alpha_3} \wedge \tilde{X}_0=\tilde{h}^{\alpha_1} \wedge \tilde{X}_1=\tilde{h}^{\alpha_3})$.

During a step F2, the cryptographic module MCR of each of the revocation entities $\{\mathcal{R}_j\}_{j=1}^t$ randomly draws a value $x_\mathcal{R}^j$ of $Z_p$. This random value $x_\mathcal{R}^j$ constitutes a private key of the revocation entity $\mathcal{R}_j$ for lifting anonymity of a signature.

During a step F4, the cryptographic modules MCR of the revocation entities $\mathcal{R}_j$ in turn calculate a public key $P_j$ associated with this private key $x_\mathcal{R}^j$. More precisely, in the embodiment described here:

- the revocation entity $\mathcal{R}_1$ calculates $P_1 = X_1^{x_\mathcal{R}^1}$ and proves that it knows the private key associated with its public key, in other words the discrete logarithm of $P_1$ in the base $X_1$.
- the revocation entity $\mathcal{R}_2$ calculates $P_2 = P_1^{x_\mathcal{R}^2}$ and proves that it knows the private key associated with its public key, in other words the discrete logarithm of $P_2$ in the base $P_1$.
- the revocation entity $\mathcal{R}_j$, for $t \geq j \geq 2$, calculates $P_1 = X_1^{x_\mathcal{R}^1}$ and proves that it knows the private key associated with its public key, in other words the discrete logarithm of $P_j$ in the base $P_{j-1}$.

During a step F6, when all the revocation entities have calculated their public key $P_j$, the cryptographic module MCR of the revocation entity $\mathcal{R}_t$ constitutes the public key of the group $PK_G=(C_{x_0}, X_1, \tilde{X}_0, \tilde{X}_1, P_t)$. It comprises the trace generator $$P_t = X_1^{\prod_{j=1}^t x_\mathcal{R}^j}$$

obtained from the private keys of each of the revocation entities $\mathcal{R}_j$. The private key associated with the public group key is $SK_G=(x_0, \tilde{x}_0, x_1, x\mathcal{R}=\prod_{j=1}^t x_\mathcal{R}^j)$.

In the embodiment described here, each member entity $V_i$ has a unique identifier $ID_{V_i}$ as well as a pair of private, public keys ($SK_i$, $PK_i$), of a digital signature algorithm, the public key $PK_i$ having been certified by a recognised certification entity, for example by the administration entity $\varepsilon\mathcal{A}$. Examples of digital signature algorithms which can be used for this purpose are: RSA, DSA, ECDSA, . . . .

To obtain its private group key the member entity $V_i$ interacts with the administration entity $\varepsilon\mathcal{A}$. During a step G2 the cryptographic module MCR of the member entity $V_i$ randomly draws a value $x_i \in Z_p$ and calculates $c_i = X_1^{x_i}$. It should be noted that the private group key $SK_G^i$ is obtained by the member entity from its private key $xi_i$ known to it only.

It then generates zero-knowledge proof $P\Pi_i$ that it knows $x_i$ the discrete logarithm of $C_i$ in base $X_1$: $P\Pi_i=PoK(\alpha_1: C_i=X_1^{\alpha_1})$. The example of such proof is provided in the document Claus-Peter Schnorr, "Efficient Identification and Signature for Smart Cards", Theory and Application of Cryptology, Springer, 1989.

During a step G4, the cryptographic module of the member entity $V_i$ generates a signature $\sigma_{V_i}$ on $C_i$: $\sigma_{V_i}=Sign_{SK_i}(C_i)$ where $SK_i$ designates the private key of $V_i$. The member entity $V_i$ then transmits these three values $C_i$, $P\Pi_1$, $\sigma_{V_i}$ to the administration entity $\varepsilon\mathcal{A}$.

During a step E10, the cryptographic module MCR of the administration entity an $\varepsilon\mathcal{A}$ verifies that $C_i \neq 1$ and that the signature $\sigma_{V_i}$ and the proof $P\Pi_i$ are both valid.

If this is the case, during a step E12 the cryptographic module MCR of the administration entity $\varepsilon\mathcal{A}$ an generates two random values b and x' of $Z_p$ and calculates $E=X_1^{x'}$ as well as a pair (u, u') where $u=h^b$ and $u'=u^{x_0}(C_i \cdot X_1^{x'})^b = u^{x_0+(x_i+x')x_1}$. It proves that the pair (u, u') has been calculated consistently and especially from the private keys $x_0$ and $x_1$:

$\Pi_3=PoK(\alpha_1, \alpha_2, \alpha_3, \alpha_4: u=h^{\alpha_1} \wedge u'=u^{\alpha_2}(C_i \cdot X_1^{\alpha_4})^{\alpha_1} \wedge C_{x_0}=g^{\alpha_2}h^{\alpha_3} \wedge E=X_1^{\alpha_4})$ During a step E14, the cryptographic module MCR of the administration entity an $\varepsilon\mathcal{A}$ transmits E, u, u' and the proof $P\Pi_3$ to the member entity $V_i$.

During a step G6, the cryptographic module of the member entity $V_i$ verifies that $u \neq 1$ and que the proof $P\Pi_3$ is valid. If these two verifications are conclusive, during a step G7 the cryptographic module of the member entity $V_i$ generates a signature $Sig_{V_i}$ on $C_i$ and E: $Sig_{V_i}=Sign_{SK_i}(C_i, E)$, where $SK_i$ designates the private key of the member entity $V_i$.

During a step G75, the member entity $V_i$ transmits the signature $Sig_{V_i}$ to the administration entity $\varepsilon\mathcal{A}$.

During a step E13, the administration entity $\varepsilon\mathcal{A}$ verifies that the signature $Sig_{V_i}$ is valid, and if this is the case, transmits x' to the member entity $V_i$.

The administration entity $\varepsilon\mathcal{A}$ maintains a register REG containing the following values for each member entity $V_i$ of the group:

$C_i, C'_i=C_i \cdot E=C_i \cdot X_1^{x'}, x', \Pi_i, ID_i, PK_i$ and $Sig_{V_i}$:
$REG=\{C_i, C'_i, x', \Pi_i, ID_i, PK_i, Sig_{V_i}\}_{i=1}^n$ where n designates the number of members duly registered.

During a step G8, the member entity $V_i$ verifies that $E=X_1^{x'}$ and constitutes its private group key $SK_G^i$, if this verification is conclusive. The latter is constituted by the triplet $SK_G^i=(s_i, u, u')$ where $s_i=x_i+x'$ mod p.

In a particular embodiment, the trace generator $P_t$ is renewed periodically (every hour, every day, start of month, etc.). For this it is enough for the revocation entities to renew their private key $x_\mathcal{R}^j$ and recalculate the corresponding trace generator $P_t$ according to the generation method described previously.

In a particular embodiment, the trace generator $P_t$ is specific to a given service. Typically a trace generator $P_t$ can be generated for a specific election. For a new ballot, the revocation entities must calculate new private keys $x'^j_\mathcal{R}$ to deduce a new trace generator $P'_t$ therefrom.

Figure 3:
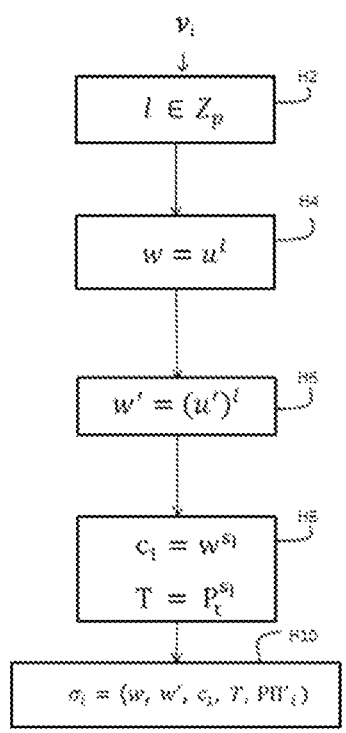
FIG. 3 illustrates the principal steps of a signature method according to the invention in the form of a flowchart.

FIG. 3 illustrates in the form of a flowchart the principal steps of a signature method according to the invention. This signature method utilises the anonymous signature scheme $SigA_2$. This scheme utilises an algorithm which produces a signature $\sigma_i$ of the message msg from a message msg, the public group key $PK_G$ and the private group key $SK_G^i$ of a member entity.

According to the anonymous signature scheme $SigA_2$, to anonymously sign a message msg$\in\{0,1\}^*$ with its private group key $SK_G^i$ the cryptographic module MCR of the member entity $V_i$ randomly draws a value $l\in Z_p$ during a step H2. At step H4 t calculates the value $w=u^l$ and at step H6 the value $w'=(u')^l$.

During a step H8, the cryptographic module MCR of the member entity $V_i$ calculates the value $c_1=w^{s_i}$ and the trace $T_i=P_t^{s_i}$. This trace $T_i$ calculated from the trace generator $P_t$ and of the element $s_i$ of the private group key of the member entity $V_i$ does not depend on the message msg. In other words, the trace $T_i$ constitutes an invariant of the signatures sent by the member entity $V_i$.

The member entity $V_i$ proves that the discrete logarithm of $c_1$ in the base w is the same as the discrete logarithm of $T_i$ in the base $P_t$: $P\Pi_i=PoK(\alpha_1:c_1=w^{\alpha_1}\wedge T_i=P_t^{\alpha_1})$.

In the embodiment of the invention described here, the proof $P\Pi'_i$ is the pair (c, r) in which:
z is a random value of $z_p$ drawn by the member entity $V_i$;
$T_1=w^z$;
$T_2=P_t^z$;
$c=\mathcal{H}(T_1, T_2, P_t, \text{msg})$;
$r=z-cs_i \mod p$ The proof is valid if $c=\mathcal{H}(w^r\ c_1^c, P_t^r\ T_i^c, P_t, m)$.

During a step H10, the cryptographic module MCR of the member entity $V_i$ generates the anonymous signature $\sigma_i$ of the message msg, the latter being constituted by the following five elements: (w, w', $c_1$, $T_i$, $P\Pi'_i$). It comprises the trace $T_i$ which traces all the signatures sent by the member entity $V_i$.

Figure 4:
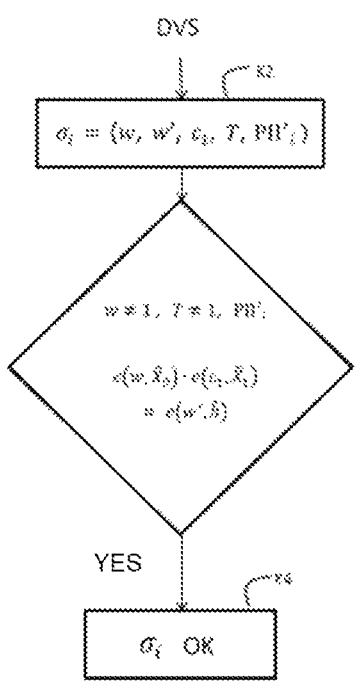
FIG. 4 illustrates the principal steps of a verification method of a signature which can be used in the invention in the form of a flowchart.

FIG. 4 illustrates in the form of a flowchart the principal steps of a verification method of an anonymous signature which can be used in the invention. This method is executed by the verification device DV of FIG. 1. It executes a verification algorithm which inputs a message msg, a signature $\sigma_i$ and the public key of the group $PK_G$. It determines whether the signature $\sigma_i$ is valid or not.

During a step K2, the verification device of an anonymous signature obtains an anonymous signature $\sigma_i=$(w, w', $c_1$, $T_i$, $P\Pi'_i$).

During a step K4, the verification device considers that the anonymous signature $\sigma_i$ of a message msg is valid if:
$w\neq 1_{G_1}$;
$T_i\neq 1_{G_1}$;
$P\Pi'_i$ is valid; and
$e(w, \tilde{X}_0)\cdot e(c_1, \tilde{X}_1)=e(w', \tilde{h})$.

Figure 5:
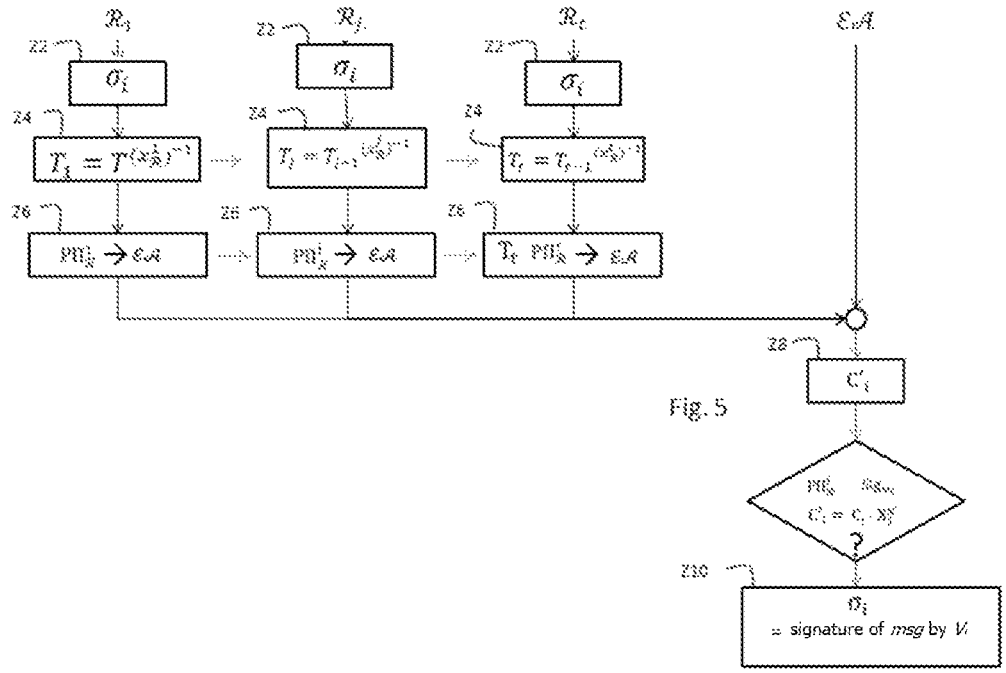
FIG. 5 illustrates the principal steps of a method for lifting anonymity which can be used in the invention in the form of a flowchart.

FIG. 5 illustrates in the form of a flowchart the principal steps of a method for lifting anonymity of a valid signature $\sigma_i=$(w, w', $c_1$, $T_i$, $\Pi'_i$) of a message msg. This method can be carried out only by the revocation entities $\mathcal{R}_j$. It utilises an algorithm which inputs a message msg, a signature $\sigma_i$, the public key of the group $PK_G$ a and the private keys $x_\mathcal{R}^j$ of the revocation authorities and returns $ID_{V_i}$ the identity of a member entity $V_i$ as well as proof that $V_i$ is the real author of this signature $\sigma_i$.

During a step Z2, each of the revocation entities $\mathcal{R}_j$ obtains the anonymous signature $\sigma_i$ of a message msg.

During a step Z4, the revocation authorities $\{\mathcal{R}_j\}_{j=1}^t$ successively calculate, $T_j=T_{j-1}^{(x_\mathcal{R}^j)^{-1}}$ with $T_0=T_i$.

In other words:
$\mathcal{R}_1$ calculates $T_1=T_i^{(x_\mathcal{R}^1)^{-1}}$ and proves ($P\Pi_\mathcal{R}^1$) that the discrete logarithm of $T_1$ in the base $T_i$ is equal to the discrete logarithm of $X_1$ in the base $P_1$.

$\mathcal{R}_2$ calculates $T_2=T_1^{(x_\mathcal{R}^2)^{-1}}$ and proves ($P\Pi_\mathcal{R}^2$) that the discrete logarithm of $T_2$ in the base $T_1$ is equal to the discrete logarithm of $P_1$ in the base $P_2$.

$\mathcal{R}_j$, for $t\geq j\geq 2$, calculates $T_j=T_1=T_i^{(x_\mathcal{R}^j)^{-1}}$ and proves ($P\Pi\mathcal{R}^j$) that the discrete logarithm of $T_j$ in the base $T_{j-1}$ is equal to the discrete logarithm of $P_{j-1}$ in the base $P_j$.

It is recalled here that there can be one single revocation entity only.

If all proofs produced by the revocation authorities are valid, $T_t=T_1=T_i^{(x_\mathcal{R}^j)^{-1}}=X_i^{s_i}=C'_i$.

During a step Z6, the revocation authorities transmit $T_t$ and all proofs $\{P\Pi\mathcal{R}^j\}_{j=1}^t$ to the administration entity $\varepsilon\mathcal{A}$.

During a step Z8, the administration entity an retrieves in its registry REG the entry corresponding to $C'_i$: $\{c_i, C'_i, x', \Pi_i, ID_i, PK_i, Sig_{V_i}\}$.

During a step Z10, the administration entity $\varepsilon\mathcal{A}$ in return provides the revocation entity $\mathcal{R}_j$ as applicant for lifting anonymity with the identifier $ID_{V_i}$, the proofs $\{P\Pi_\mathcal{R}^j\}_{j=1}^t$ as well as $c_i$, $C'_i$, x', $PK_i$ and $Sig_{V_i}$. If all the proofs $\{P\Pi_\mathcal{R}^j\}_{j=1}^t$ are valid, if $C'_j=C_i\cdot X_1^{x'}$ and if the signature $Sig_{V_i}$ is valid then the administration entity $\varepsilon\mathcal{A}$ considers that the member entity $V_i$ of which the identifier is $ID_{V_i}$ is the real author of the signature $\sigma_i$ of the message msg.

When the service is an electronic vote, it is possible to compile a voting list from the identifiers obtained by executing the method.

Description of a Second Embodiment of the Invention

The anonymous signature scheme $SigA_2$ can be used in particular to implement an electronic vote solution.

Figure 6:
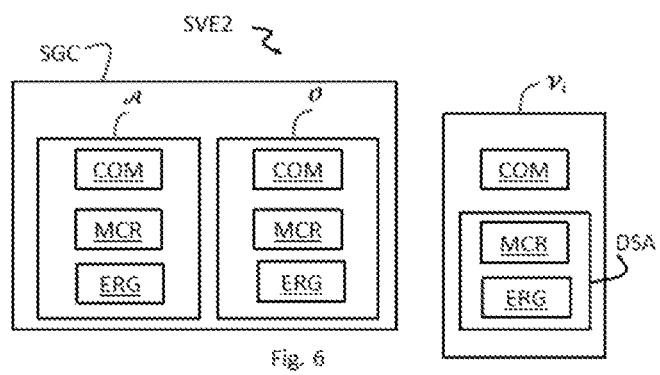
FIG. 6 illustrates an electronic voting system according to an embodiment of the invention.

FIG. 6 illustrates a voting system electronic SVE2 according to the invention. This system comprises a system SGC for generating keys for an anonymous signature scheme $SigA_2$ and a member entity $V_i$ of a group $\mathcal{G}$ according to the invention. It also comprises a verification device DV.

In this embodiment, the member entities $V_i$ of a group are voter entities.

In this embodiment, the system SGC for generating keys comprises a registration entity $\mathcal{A}$ and an organising entity $\mathcal{O}$. At the same time each acts as administration entity of the group and revocation entity of the group. It is understood that this is an illustrative example and that in other examples the distribution of roles attributed to the different entities can be different. The registration entity $\mathcal{A}$ and the organising entity $\mathcal{O}$ each comprise a communications module COM and a cryptographic module MCR. The registration entity $\mathcal{A}$ and the organising entity $\mathcal{O}$ also each comprise a registration module ERG configured to register at least one voter entity $V_i$ in the group.

Therefore, in this embodiment of the invention a voter entity is registered at the same time with the registration entity $\mathcal{A}$ and with the organising entity $\mathcal{O}$. This embodiment reprises the role of group administrator between two entities so as to prevent a single entity from being capable of creating false voter entities.

The voter entity $V_i$ comprises a communications module COM and an anonymous signature device DSA according to the invention.

The device DSA of the voter entity $V_i$ comprises a registration module ERG configured to register the voter entity $V_i$ with the registration entity $\mathcal{A}$.

In the embodiment described here, the cryptographic module MCR of each revocation entity $\mathcal{A}, \mathcal{O}$ is configured to calculate a pair of revocation keys of which the private key can be used to revoke the anonymity of an anonymous signature complying with said scheme $SigA_2$ and to calculate a trace generator from a public key of the pair of revocation keys.

The device DSA of each voter entity $V_i$ comprises a cryptographic module MCR configured to generate a trace $T_i = P_t^{s_i}$ by using this trace generator, this trace $T_i$ being invariant relative to the anonymous signatures $\sigma_i$ generated by the voter entity in accordance with the scheme $SigA_2$.

In the embodiment described here, the cryptographic module MCR of each voter entity $V_i$ is configured to blindly obtain a private group key $SK_G^i$, noted $s_i$ hereinbelow.

In the embodiment described here, the cryptographic module MCR of each voter entity $V_i$ is configured to generate signatures $\sigma_i$ of messages, by using the private group key, these signatures comprising the trace $T_i$.

The verification device DV is configured to verify if an anonymous signature $\sigma_i$ is compliant with the anonymous signature scheme $SigA_2$. It executes a verification algorithm which inputs a message msg, a signature $\sigma_i$ and the public key of the group $PK_G$. It determines whether the signature $\sigma_i$ is valid or not.

In the embodiment described here, the verification device DV comprises communication means COM and a cryptographic module MCR.

The communications module COM is capable of obtaining an anonymous signature $\sigma_i$ such that $\sigma_i = (w, w', c_1, T_i, \Pi'_i)$.

The cryptographic module MCR is configured to determine that the anonymous signature $\sigma_i$ of a message msg is valid if:

$w \neq 1_{G_1}$;
$T_i \neq 1_{G_1}$;
$\Pi'_i$ is valid; and
$e(w, \tilde{X}_0) \cdot e(c_1, \tilde{X}_1) = e(w', \tilde{h})$.

In the embodiment described here, the cryptographic module MCR of a revocation entity $\mathcal{A}, \mathcal{O}$ is configured to execute the method for lifting anonymity of a signature described later in reference to FIG. 10.

Figure 7:
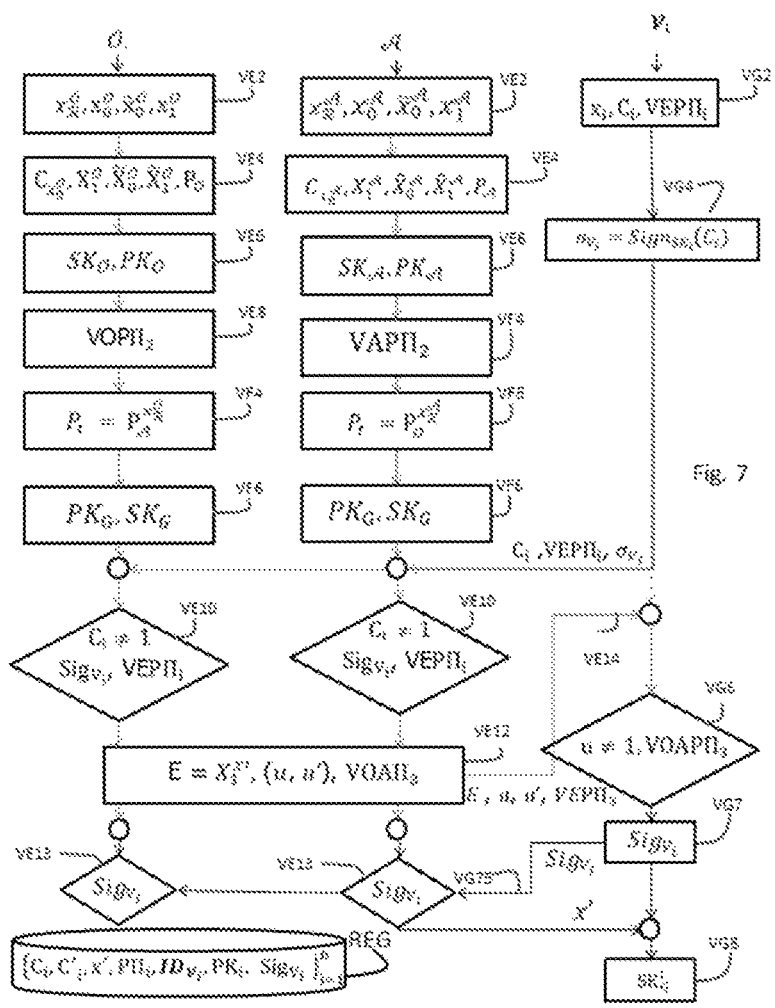
FIG. 7 illustrates the principal steps of a method for generating keys in the voting system of FIG. 6 in the form of a flowchart.

FIG. 7 illustrates in the form of a flowchart a method for generating keys of the voter entities according to this embodiment of the invention.

During a step VE2, the cryptographic module MCR of the organising entity $\mathcal{O}$ randomly draws four values $x_R^\mathcal{O}, x_0^\mathcal{O}, \tilde{x}_0^\mathcal{O}, x_1^\mathcal{O}$ of $z_p$. In this embodiment, $x_R^\mathcal{O}$ is a private key used by the organising entity $\mathcal{O}$ for lifting the anonymity of a voter entity.

During a step VE4, the cryptographic module MCR of the organising entity $\mathcal{O}$ calculates $C_{x_0^\mathcal{O}} = g^{x_0^\mathcal{O}} h^{\tilde{x}_0^\mathcal{O}}, X_1^\mathcal{O} = h^{x_1^\mathcal{O}}, \tilde{X}_0^\mathcal{O} = \tilde{h}^{x_0^\mathcal{O}}, \tilde{X}_1^\mathcal{O} = \tilde{h}^{x_1^\mathcal{O}}, P_\mathcal{O} = x_R^\mathcal{O}$.

During a step VE6, the cryptographic module MCR of the organising entity $\mathcal{O}$ constitutes a pair of keys in which:

the private key $SK_\mathcal{O}$ is constituted by the four values $(x_R^\mathcal{O}, x_0^\mathcal{O}, \tilde{x}_0^\mathcal{O}, x_1^\mathcal{O})$ which have been drawn randomly; and the public key $PK\mathcal{O}$ is constituted by the elements calculated at step VE4: $PK\mathcal{O} = (C_{x_0^\mathcal{O}}, X_1^\mathcal{O}, \tilde{x}_0^\mathcal{O}, \tilde{X}_1^\mathcal{O}, \tilde{h}^{x_1^\mathcal{O}})$.

During a step VE8, the cryptographic module MCR of the organising entity $\mathcal{O}$ generates proof $VO\Pi_2$ that it knows the private key associated with its public key by generating zero-knowledge proof defined as follows: $VO\Pi_2 = PoK(\alpha_1, \alpha_2, \alpha_3, \alpha_4: C_{x_0^\mathcal{O}} = g^{\alpha_1} h^{\alpha_2} \wedge X_1^\mathcal{O} = h^{\alpha_3} \wedge \tilde{X}_0^\mathcal{O} = \tilde{h}^{\alpha_1} \wedge \tilde{X}_1^\mathcal{O} = \tilde{h}^{\alpha_3} \wedge \tilde{h}^{x_1^\mathcal{O}} = X_1^{\alpha_4})$.

The registration entity $\mathcal{A}$ proceeds in the same way.

During a step VE2, the cryptographic module MCR of the registration entity $\mathcal{A}$ randomly draws four values $x_R^\mathcal{A}, x_0^\mathcal{A}, \tilde{x}_0^\mathcal{A}, x_1^\mathcal{A}$ of $Z_p$. In this embodiment, $x_R^\mathcal{A}$ is a private key used by the registration entity $\mathcal{A}$ for lifting the anonymity of a voter entity.

During a step VE4, the cryptographic module MCR of the registration entity $\mathcal{A}$ calculates $x_1^\mathcal{A} = \tilde{h}^{x_1^\mathcal{O}}, g^{x_0^\mathcal{A}} h^{\tilde{x}_0^\mathcal{A}} = X_1^\mathcal{A}, h^{x_1^\mathcal{A}} = \tilde{X}_0^\mathcal{A}, \tilde{h}^{x_0^\mathcal{A}} = \tilde{X}_1^\mathcal{A}, \tilde{h}^{x_1^\mathcal{A}} = P_\mathcal{A}$.

During a step VE6, the cryptographic module MCR of the registration entity $\mathcal{A}$ constitutes a pair of keys in which:

the private key $SK_\mathcal{A}$ is constituted by the four values $(x_R^\mathcal{A}, x_0^\mathcal{A}, \tilde{x}_0^\mathcal{A}, x_1^\mathcal{A})$ which have been drawn randomly; and the public key $SK_\mathcal{A}, SK_\mathcal{A}$ is constituted by the elements calculated at step VE4: $PK_\mathcal{O} = (x_1^\mathcal{A}, x_1^\mathcal{A}, \tilde{x}_0^\mathcal{A}, \tilde{X}_1^\mathcal{A}, P_\mathcal{A})$.

During a step VE8, the cryptographic module MCR of the registration entity $\mathcal{A}$ generates proof $VA\Pi_2$ that it knows the private key associated with its public key. This proof is defined as follows:

$$VA\Pi_2 = PoK(\alpha_1, \alpha_2, \alpha_3, \alpha_4: x_1^\mathcal{A} = g^{\alpha_1} h^{\alpha_2} \wedge$$
$$g^{x_0^\mathcal{A}} h^{\tilde{x}_0^\mathcal{A}} = h^{\alpha_3} \wedge h^{x_1^\mathcal{A}} = \tilde{g}^{\alpha_1} \wedge \tilde{h}^{x_0^\mathcal{A}} = \tilde{h}^{\alpha_3} \wedge$$
$$\tilde{h}^{x_1^\mathcal{O}} = X_1^{\alpha_4})$$

During a step VF4, the cryptographic modules MCR of the organising entity $\mathcal{O}$ and of the registration entity $\mathcal{A}$, after having made their public keys $P_\mathcal{O}$ and $P_\mathcal{A}$ public, each calculate for their part a trace generator $P_t = X_1^{x_R^\mathcal{A} \cdot x_R^\mathcal{O}} = P_\mathcal{O}^{x_R^\mathcal{A}} = P_\mathcal{A}^{x_R^\mathcal{O}}$.

During a step VF6, when all the revocation entities, specifically the registration entity $\mathcal{A}$ and the organising entity $\mathcal{O}$ in this embodiment, have calculated their public key, they calculate the public key of the group $PK_G$. It comprises the trace generator $P_t = X_1^{x_R^\mathcal{A} \cdot x_R^\mathcal{O}}$ obtained from the private keys of these revocation entities $\mathcal{A}$ and $\mathcal{O}$.

$PK_G = (C_{x_0}, X_1, \tilde{X}_0, \tilde{X}_1, P_t)$ where $c_{x_0} = x_1^\mathcal{A} \cdot x_1^\mathcal{A}$, $X_1 = X_1^\mathcal{O} \cdot g^{x_0^\mathcal{A}} h^{\tilde{x}_0^\mathcal{A}}$, $\tilde{X}_0 = \tilde{X}_0^\mathcal{O} \cdot \tilde{X}_1^\mathcal{A}$ and $\tilde{X}_1 = \tilde{X}_1^\mathcal{O} \cdot \tilde{X}_1^\mathcal{A}$. The private key associated with the public group key is $$SK_G = (x_0 = x_0^\mathcal{O} + x_0^\mathcal{A}, \tilde{x}_0 = \tilde{x}_0^\mathcal{O} + \tilde{x}_0^\mathcal{A}, x_1 = x_1^\mathcal{O} + x_1^\mathcal{A},$$
$$x_R = x_R^\mathcal{A} \cdot x_R^\mathcal{O})$$

In this embodiment, each voter entity $V_i$ has a unique identifier $ID_{V_i}$ as well as a pair of keys, private and public $(SK_i, PK_i)$, of an algorithm of digital signature, the public key $PK_i$ having been certified previously by a recognised certification authority, for example by the registration entity $\mathcal{A}$ and by the organising entity $\mathcal{O}$.

In the embodiment described here, to obtain its private group key the voter entity $V_i$ must interact with the administration entity $\mathcal{A}$ and with the organising entity $\mathcal{O}$. During a step VG2 the cryptographic module MCR of the member entity $V_i$ randomly draws a value $x_i \in Z_p$ and calculates $C_i = X_1^{x_i}$. It then generates zero-knowledge proof $VEP\Pi_i$ that it knows $x_i$ the discrete logarithm of $C_i$ in base $X_1$: $VEP\Pi_i = PoK(\alpha_1: C_i = X_1^{\alpha_1})$.

During a step VG4, the cryptographic module MCR of the voter entity $V_i$ generates a signature $\sigma_{V_i}$ on $C_i$: $\sigma_{V_i} = Sign_{SK_i}(C_i)$ where $SK_i$ designates the private key of $V_i$. The voter entity $V_i$ then transmits these three values $C_i$, $VEP\Pi_i$, $\sigma_{V_i}$, to the administration entity $\mathcal{A}$ and to the organising entity $\mathcal{O}$.

During a step VE10, the cryptographic module MCR of the administration entity $\mathcal{A}$ and the cryptographic module MCR of the organising entity $\mathcal{O}$ verify $c_i \neq 1$ and that the signature $\sigma_{V_i}$ and the proof $P\Pi_i$ are both valid.

If this is the case, during a step VE12 the cryptographic module MCR of the administration entity $\mathcal{A}$ and the cryptographic module MCR of the organising entity $\mathcal{O}$ jointly generate two random values b and x' of $z_p$ and calculate $E = X_1^{x_1}$ and a pair (u, u') where $u = h^b$ and $u' = u^{x_0}(C_i \cdot X_1^{x'})^b = u^{x_0 + (x_i + x')x_1}$. They prove that the pair (u, u') has been calculated consistently and especially from the private keys $x_0$ and $x_1$:

$$VOA\Pi_3 = PoK(\alpha_1, \alpha_2, \alpha_3, \alpha_4: u = h^{\alpha_1} \wedge u' = u^{\alpha_2}(C_i \cdot X_1^{\alpha_4})^{\alpha_1} \wedge C_{x_0} = g^{\alpha_2} h^{\alpha_3} \wedge E = X_1^{\alpha_4})$$

It is recalled that to jointly generate a value, the value x' for example, the administration entity $\mathcal{A}$ and the organising entity $\mathcal{O}$ can utilise known techniques of distributed cryptography. For example, the administration entity $\mathcal{A}$ (respectively the organising entity $\mathcal{O}$) randomly generates a value $x'^{\mathcal{A}}$ of $Z_p$ (respectively $x'^{\mathcal{O}}$ of $z_p$) and calculates $E'^{\mathcal{A}} = X_1^{x'^{\mathcal{A}}}$ (respectively $X_1^{x'^{\mathcal{O}}}$). This gives $E = E'^{\mathcal{A}} \cdot E'^{\mathcal{O}} = X_1^{x'}$ where $x' = x'^{\mathcal{A}} + x'^{\mathcal{O}} \pmod{p}$.

In this embodiment, during a step VE14 the cryptographic module MCR of the administration entity $\mathcal{A}$ or of the organising entity $\mathcal{O}$ transmits E, u, u' and the proof $VEP\Pi_3$ to the voter entity $V_i$. As a variant these values are sent by the administration entity $\mathcal{A}$ and by the organising entity $\mathcal{O}$ and the voter entity $V_i$ verifies that the values received from the two entities $\mathcal{A}$ and $\mathcal{O}$ are identical.

During a step VG6, the cryptographic module of the voter entity $V_i$ verifies that $u \neq 1$ and that the proof $VOAP\Pi_3$ is valid. If these two verifications are conclusive, during a step VG7 the cryptographic module of the voter entity $V_i$ generates a signature $Sig_{V_i}$ on $C_i$ and E: $Sig_{V_i} = Sign_{SK_i}(C_i, E)$, where $SK_i$ designates the private key of the voter entity $V_i$. During a step VG75, the voter entity $V_i$ transmits the signature $Sig_{V_i}$ to the administration entity $\mathcal{A}$ and to the organising entity $\mathcal{O}$.

During a step VE13, the administration entity $\mathcal{A}$ and the organising entity $\mathcal{O}$ verify that the signature $Sig_{V_i}$ is valid, and if this is the case the administration entity $\mathcal{A}$ transmits x' to the voter entity $V_i$.

The administration entity $\mathcal{A}$ maintains a register REG, not shown, containing the following values for each member entity $V_i$ of the group:

$$C_i, C'_i = C_i \cdot X_1^{x'}, x', P\Pi_i, ID_i, PK_i \text{ and } Sig_{V_i}: REG = \{C_i, C'_i, x', P\Pi_i, ID_{v_i}, PK_i, Sig_{V_i}\}_{i=1}^n$$

where n designates the number of voter entities duly registered.

During a step VG8, the voter entity $V_i$ verifies that $E = X_1^{x'}$ and constitutes its private group key $SK_G^i$, if this verification is conclusive. The latter is constituted by the triplet $SK_G^i = (s_i, u, u')$ where $s_i = x_i + x' \mod p$. It should be noted that said private group key $SK_G^i$ is obtained by the member entity from its private key $xi_i$ known to it alone.

Figure 8:
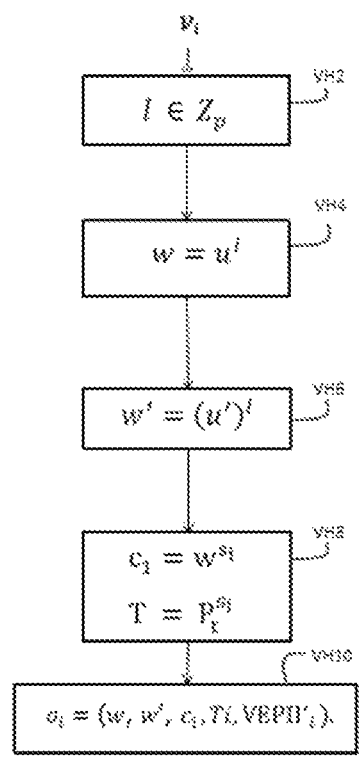
FIG. 8 illustrates the principal steps of a voting method according to the invention in the form of a flowchart.

FIG. 8 illustrates the principal steps of a voting method according to this embodiment of the invention in the form of a flowchart.

According to the anonymous signature scheme $SigA_2$, for anonymously signing any message $msg \in \{0,1\}^*$ with its private group key $SK_G^i$ the cryptographic module MCR of the voter entity $V_i$ randomly draws a value $l \in Z_p$ during a step VH2 and calculates (step VH4) the value $w = u^l$ (step VH6) as well as the value $w' = (u')^l$.

In the case of a one-ballot uninominal majority poll the message can be constituted by the vote of the voter entity, optionally in encrypted form, the encryption of which can be calculated by using a public key of which the private key would be shared between several assessor entities configured to carry out counting of the vote.

During a step VH8, the cryptographic module MCR of the voter entity $V_i$ calculates the value $c_1 = w^{s_i}$ and the trace $T_i = P_t^{s_i}$. This trace $T_i$ calculated from the trace generator $P_t$ and the element $s_i$ of the private group key of the voter entity V does not depend on the message msg. In other words, the trace $T_i$ therefore constitutes an invariant of the signatures sent by the voter entity $V_i$.

The voter entity $V_i$ proves that the discrete logarithm of $c_1$ in the base w is the same as the discrete logarithm of $T_i$ in the base $P_t$: $VEP\Pi'_i = PoK(\alpha_1: c_1 = w^{\alpha_1} \wedge T_i = P_t^{\alpha_1})$.

In the embodiment of the invention described here, the proof $VEP\Pi'_i$ is the pair (c, r) in which:

z is a random value of $z_p$ drawn by the voter entity $V_i$;

$T_1 = w^z$;

$T_2 = P_t^z$;

$c = \mathcal{H}(T_1, T_2, P_t, msg)$;

$r = z - cs_i \mod p$

The proof is valid if $c = \mathcal{H}(w^r c_1^c, P_t^r T_i^c, P_t, m)$.

During a step VH10, the cryptographic module MCR of the voter entity $V_i$ generates the anonymous signature $\sigma_i$ of the message msg, the latter being constituted by the following five elements: $(w, w', c_1, T_i, VEP\Pi'_i)$. It comprises the trace $T_i$ which traces all the signatures sent by the voter entity $V_i$.

Figure 9:
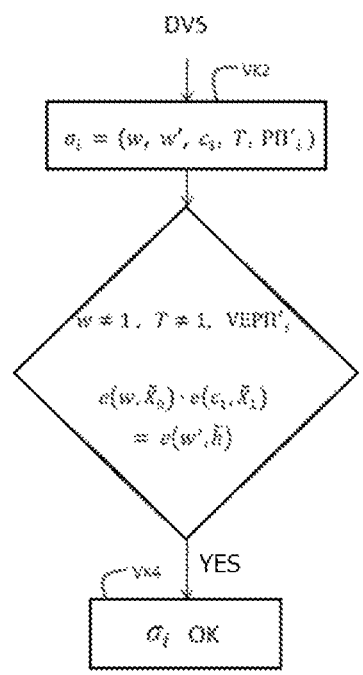
FIG. 9 illustrates the principal steps of a verification method of a signature which can be used in the voting system of FIG. 6 in the form of a flowchart.

FIG. 9 illustrates the principal steps of a verification method of an anonymous signature according to the invention in the form of a flowchart.

During a step VK2, the verification device of an anonymous signature obtains an anonymous signature $\sigma_i = (w, w', c_1, T_i, VEP\Pi'_i)$.

During a step VK4, it considers that the anonymous signature $\sigma_i$ of message msg is valid if:

$w \neq 1_{G_1}$;

$T_i \neq 1_{G_1}$;

$VEP\Pi'_i$ is valid; and $e(w, \tilde{X}_0) \cdot e(c_1, \tilde{X}_1) = e(w', \tilde{h})$.

Figure 10:
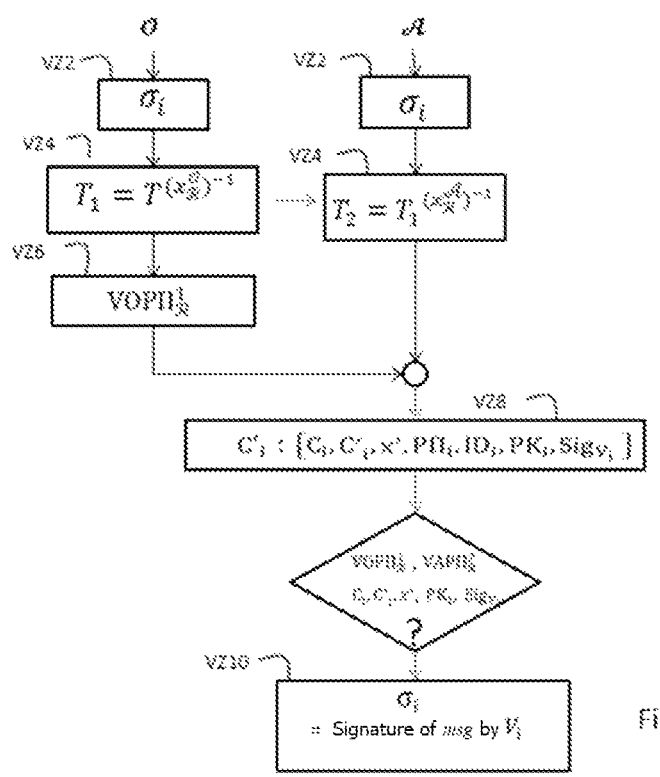
FIG. 10 illustrates the principal steps of a method for lifting anonymity which can be used in the voting system of FIG. 6 in the form of a flowchart.

In the form of a flowchart FIG. 10 illustrates the principal steps of a method for lifting anonymity of the valid signature $\sigma_i=(w, w', c_1, T_i, \Pi'_i)$ of a message msg according to this second embodiment of the invention. This method is executed by the registration entity $\mathcal{A}$ and the organising entity $\mathcal{O}$.

During a step VZ2, each of these entities $\mathcal{A}$ and $\mathcal{O}$ obtains the signature $\sigma_i$.

During a step VZ4, the entities $\mathcal{A}$ and $\mathcal{O}$ successively calculate, $T_1 = T_i^{(x_R^0)^{-1}}$ with $T_0=T_i$.

$\mathcal{O}$ calculates $T_1 = T_i^{(x_R^0)^{-1}}$ and proves ($\text{VO}\Pi_R^1$) that the discrete logarithm of $T_1$ in the base $T_i$ is equal to the discrete logarithm of $X_1$ in the base $P_1$.

$\mathcal{A}$ calculates $T_2 = T_1^{(x_R^a)^{-1}}$ and proves ($\text{VA}\Pi\mathcal{R}^2$) that the discrete logarithm of $T_2$ in the base $T_1$ is equal to the discrete logarithm of $P_1$ in the base $P_2$.

If all the proofs produced by the revocation authorities are valid, $T_2 = T_i^{(x_R^0)^{-1}(x_R^a)^{-1}} = X_1^{s_1} = C'_i$.

In this embodiment, during a step VZ6, the organising entity $\mathcal{O}$ transmits the proof $\text{VO}\Pi\mathcal{R}^1$ to the registration entity $\mathcal{A}$.

During a step VZ8, the registration entity $\mathcal{A}$ retrieves in its register REG the entry corresponding to $C'_i$: $\{C_i, C'_i, x', \Pi_i, \text{ID}_i, \text{PK}_i, \text{Sig}_{V_i}\}$.

During a step VZ10, the registration entity $\mathcal{A}$ returns the identifier $\text{ID}_{V_i}$, the proofs $\text{VO}\Pi_R^1$ and $\text{VA}\Pi_R^2$ and $C_i, C'_i, x'$, $\text{PK}_i$ and $\text{Sig}_{V_i}$. If all the proofs are valid, if $C'_i=C_i \cdot X_1^{x'}$ and if the signature $\text{Sig}_{V_i}$ is valid then the registration entity $\mathcal{A}$ considers that the voter entity $V_i$ including the identifier is $\text{ID}_{V_i}$ is the real author of the signature $\sigma_i$ of the message msg.

Figure 11:
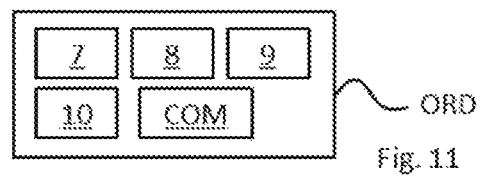
FIG. 11 illustrates the hardware architecture of the devices used in the invention, in a particular embodiment.

In the embodiment described here, the administration entity $\varepsilon\mathcal{A}$, the revocation entities $\mathcal{R}_j$, the organising entity $\mathcal{O}$, the registration entity $\mathcal{A}$, the verification device DV the member or voter entities $V_1$ have the hardware architecture of a computer ORD such as shown schematically in FIG. 11.

The computer ORD comprises especially a processor 7, a dead memory 8, a live memory 9, a non-volatile memory 10 and communication means COM. These communication means COM allow the different entities to communicate with each other especially. They can comprise one or more communication interfaces on one or more telecommunications networks (fixed or mobile, wired or wireless, etc.).

The dead memory 8 of the computer ORD constitutes a recording medium according to the invention, readable by the processor and on which a computer program according to the invention is registered, designated generally here by PROG, comprising instructions for executing one of the methods forming the subject of the invention. Therefore:

for the administration entity $\varepsilon\mathcal{A}$, the program PROG is a program PROG1 comprising instructions for executing steps E2 to E12 of a method for generating a key according to the invention, and steps Z8 to Z10 of a method for lifting anonymity according to the invention, for the revocation entities $\mathcal{R}_j$, the program PROG is a program PROG1 comprising instructions for executing steps F2 to F6 of a method for generating a key according to the invention, and steps Z2 to Z6 of a method for lifting anonymity according to the invention, for the organising entity $\mathcal{V}$, the program PROG is a program PROG2 comprising instructions for executing steps VE2 to VE12 of a method for generating a key according to the invention and steps VZ2 to VZ6 of a method for lifting anonymity according to the invention, for the registration entity $\mathcal{A}$, the program PROG is a program PROG3 comprising instructions for executing steps VE2 to VE12 of a method for generating a key according to the invention and steps VZ2 to VZ10 of a method for lifting anonymity according to the invention, for the verification device DV, the program PROG is a program PROG4 comprising instructions for executing steps K2 to K4 or VK2 to VK4 of a signature verification method according to the invention, for the member entities $V_i$, the program PROG is a program PROG5 comprising instructions for executing steps G2 to G8 or VG2 to VG8 of the method for generating a key according to the invention, steps H2 to H10 or VH2 to VH10 of a signature method according to the invention.

In the same way each of these programmes defines functional modules of the device or of the module on which it is installed, capable of performing the steps of the relevant method and based on the hardware elements 7-10 of the computer ORD.

The invention claimed is:

1. A method for anonymous signature of a message executed by a member entity of a group and comprising:
    registering said member with an administration entity of the group;
    generating by said member entity a trace from a trace generator calculated by at least one revocation entity and included in a public key of said group, said trace being invariant relative to anonymous signatures generated by said member entity in accordance with an anonymous signature scheme;
    blindly obtaining by said member entity a private group key;
    generating at least one signature according to the anonymous signature scheme by using said private group key, said at least one signature comprising said trace.

2. A method for generating keys for an anonymous signature scheme, said method comprising:
    calculating by at least one revocation entity a pair of revocation keys comprising a public key and a private key, said private key being usable by said revocation entity to revoke anonymity of an anonymous signature complying with said anonymous signature scheme;
    registering by a group administration entity at least one member entity with a group;
    calculating, from the public key of said pair of revocation keys, a trace generator, said trace generator being intended to be used by each of said at least one member entity to generate a trace representative of said at least one member entity, said trace being invariant relative to anonymous signatures generated by said at least one member entity in accordance with said anonymous signature scheme; and
    said at least one member entity blindly obtaining a private group key, said private key being used by said at least one member entity to generate the anonymous signatures in accordance with said anonymous signature scheme, said anonymous signatures comprising said trace.

3. The method for generating keys according to claim 2, said method comprising:
  generating, by the group administration entity, a pair of keys of said anonymous signature scheme for the group administration entity;
  the public key of said at least one revocation entity being calculated from a public key of said pair of keys of said anonymous signature scheme.

4. The method for generating keys according to claim 2 in which said trace generator is renewed periodically.

5. The method according to claim 2 in which said trace generator is specific to a given service.

6. A system for generating keys for an anonymous signature scheme, this system comprising:
  at least one revocation entity comprising:
    at least one first processor;
    at least one first computer readable medium comprising first instructions stored thereon which when executed by the at least one first processor configure the at least one revocation entity to calculate a pair of revocation keys comprising a public key and a private key, said private key being usable by said at least one revocation entity to revoke anonymity of an anonymous signature complying with said anonymous signature scheme;
  a group administration entity comprising:
    at least one second processor;
    at least one second computer readable medium comprising second instructions stored thereon which when executed by the at least one second processor configure the group administration revocation entity to register at least one member entity with a group;
  said first instructions further configuring the at least one revocation entity to calculate, from the public key of said pair of revocation keys, a trace generator, said trace generator being intended to be used by each of the at least one member entity to generate a trace representative of said member entity, said trace being invariant relative to anonymous signatures generated by said member entity in accordance with said anonymous signature scheme; and
  said at least one member entity, which comprises:
    at least one third processor;
    at least one third computer readable medium comprising third instructions stored thereon which when executed by the at least one third processor configure the at least member entity to blindly obtain a private group key, said private group key being used by said member entity to generate the anonymous signatures complying with said anonymous signature scheme, said anonymous signatures comprising said trace.

7. An anonymous signature device of a member entity of a group and comprising:
  at least one processor; and
  at least one non-transitory computer-readable medium comprising instructions stored thereon which when executed by the at least one processor configure the anonymous signature device to:
  register said member entity with an administration entity of the group;
  generate a trace from a trace generator calculated by at least one revocation entity and included in a public key of said group, said trace being invariant relative to anonymous signatures generated by said member entity in accordance with an anonymous signature scheme;
  blindly obtain a private group key; and
  generate the anonymous signatures by using said private group key, said anonymous signatures comprising said trace.

* * * * *